United States Patent
Toi et al.

(10) Patent No.: US 11,824,166 B2
(45) Date of Patent: *Nov. 21, 2023

(54) SECONDARY BATTERY

(71) Applicant: SANYO Electric Co., Ltd., Kadoma (JP)

(72) Inventors: Shinji Toi, Hyogo (JP); Taiki Nonaka, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/880,717

(22) Filed: Aug. 4, 2022

(65) Prior Publication Data

US 2022/0376306 A1 Nov. 24, 2022

Related U.S. Application Data

(63) Continuation of application No. 16/725,616, filed on Dec. 23, 2019, now Pat. No. 11,444,332.

(30) Foreign Application Priority Data

Feb. 18, 2019 (JP) .................................. 2019-026198

(51) Int. Cl.
*H01M 10/0585* (2010.01)
*H01M 10/04* (2006.01)
(Continued)

(52) U.S. Cl.
CPC ....... *H01M 10/0585* (2013.01); *H01M 4/667* (2013.01); *H01M 4/668* (2013.01);
(Continued)

(58) Field of Classification Search
CPC .. H01M 10/0585; H01M 4/667; H01M 4/668; H01M 10/0413; H01M 10/0468;
(Continued)

(56) References Cited

U.S. PATENT DOCUMENTS

2012/0156531 A1 6/2012 Guen
2012/0202105 A1* 8/2012 Shinyashiki ........ H01M 10/052
429/153
(Continued)

FOREIGN PATENT DOCUMENTS

CN 2914349 Y 6/2007
CN 102629678 A 8/2012
(Continued)

OTHER PUBLICATIONS

English Translation of CN Office Action dated Sep. 6, 2023 issued in counterpart CN application No. 201911270170.0. (5 pages).

*Primary Examiner* — Matthew T Martin
*Assistant Examiner* — Bartholomew A Hornsby
(74) *Attorney, Agent, or Firm* — WHDA, LLP

(57) ABSTRACT

A secondary battery includes a rectangular exterior body having an opening and containing a first electrode assembly and a second electrode assembly, a sealing plate sealing the opening, and a positive-electrode current collector. The sealing plate has an electrolytic solution introduction hole. The first electrode assembly includes a first insulating sheet on an outermost surface thereof adjacent to the second electrode assembly. The second electrode assembly includes a second insulating sheet on an outermost surface thereof adjacent to the first electrode assembly. A first tape is attached to both an outermost surface of a first positive-electrode tab group and the first insulating sheet. A second tape is attached to both an outermost surface of a second positive-electrode tab group and the second insulating sheet. At least one of the first tape and the second tape is located to face the electrolytic solution introduction hole.

8 Claims, 7 Drawing Sheets

(51) Int. Cl.
*H01M 4/66* (2006.01)
*H01M 50/54* (2021.01)
*H01M 50/636* (2021.01)
*H01M 50/627* (2021.01)
*H01M 50/463* (2021.01)
*H01M 50/103* (2021.01)
*H01M 50/586* (2021.01)

(52) U.S. Cl.
CPC ... *H01M 10/0413* (2013.01); *H01M 10/0468* (2013.01); *H01M 50/54* (2021.01); *H01M 50/627* (2021.01); *H01M 50/636* (2021.01); *H01M 50/103* (2021.01); *H01M 50/463* (2021.01); *H01M 50/586* (2021.01)

(58) Field of Classification Search
CPC .. H01M 50/54; H01M 50/627; H01M 50/636; H01M 50/103; H01M 50/463; H01M 50/586

See application file for complete search history.

(56) References Cited

U.S. PATENT DOCUMENTS

| | | | |
|---|---|---|---|
| 2013/0323546 A1 | 12/2013 | Kim et al. | |
| 2016/0099457 A1* | 4/2016 | Park | H01M 10/0431 |
| | | | 429/161 |
| 2019/0013507 A1* | 1/2019 | Shinyashiki | H01M 50/54 |

FOREIGN PATENT DOCUMENTS

| | | |
|---|---|---|
| CN | 107851770 A | 3/2018 |
| JP | 2018-29006 A | 2/2018 |

* cited by examiner

SECONDARY BATTERY

CROSS REFERENCE TO RELATED APPLICATIONS

This is a Continuation of U.S. patent application Ser. No. 16/725,616 filed Dec. 23, 2019, which claims priority under 35 U.S.C. Section 119 to Japanese Patent Application No. 2019-026198 filed on Feb. 18, 2019, the entire contents of which is herein incorporated by reference.

BACKGROUND OF THE INVENTION

Field of the Invention

The present disclosure relates to a secondary battery.

Description of Related Art

Driving power sources of, for example, electric vehicles (EVs) and hybrid electric vehicles (HEVs or PHEVs) include a secondary battery, such as an alkaline secondary battery or a nonaqueous electrolyte secondary battery.

A secondary battery includes a battery case constituted by an exterior body having the shape of a tube with an opening and a bottom and a sealing plate that seals the opening. The battery case contains an electrode assembly, which includes positive electrode plates, negative electrode plates, and separators, together with an electrolyte. A positive electrode terminal and a negative electrode terminal are attached to the sealing plate. The positive electrode terminal is electrically connected to the positive electrode plates by a positive-electrode current collector. The negative electrode terminal is electrically connected to the negative electrode plates by a negative-electrode current collector.

In such a secondary battery, the sealing plate has an electrolytic solution introduction hole.

Electrolytic solution is introduced into the battery case through the electrolytic solution introduction hole, and then the electrolytic solution introduction hole is sealed with a sealing member (Japanese Published Unexamined Patent Application No. 2018-29006).

BRIEF SUMMARY OF THE INVENTION

An object of the present disclosure is to provide a highly reliable secondary battery in which short-circuiting between a positive electrode plate and a negative electrode plate is prevented.

A secondary battery according to an embodiment of the present disclosure includes a first electrode assembly including a positive electrode plate and a negative electrode plate; a second electrode assembly including a positive electrode plate and a negative electrode plate; an exterior body having an opening and containing the first electrode assembly and the second electrode assembly; a sealing plate sealing the opening; a current collector that is closer to the sealing plate than are the first electrode assembly and the second electrode assembly; and a terminal electrically connected to the current collector and attached to the sealing plate. The sealing plate has an electrolytic solution introduction hole. The first electrode assembly includes a first insulating sheet on an outermost surface thereof adjacent to the second electrode assembly. The second electrode assembly includes a second insulating sheet on an outermost surface thereof adjacent to the first electrode assembly. The first electrode assembly includes a first electrode tab group at an end thereof adjacent to the sealing plate, the first electrode tab group being electrically connected to the positive electrode plate or the negative electrode plate. The second electrode assembly includes a second electrode tab group at an end thereof adjacent to the sealing plate, the second electrode tab group being electrically connected to the positive electrode plate or the negative electrode plate. The first electrode tab group and the second electrode tab group are connected to the current collector. A first tape is attached to both the outermost surface of the first tab group and the first insulating sheet. A second tape is attached to both the outermost surface of the second tab group and the second insulating sheet. At least one of the first tape and the second tape is located to face the electrolytic solution introduction hole. The electrolytic solution introduction hole is sealed by the sealing member.

When a secondary battery includes an electrode assembly including a stacked end portion at which an end portion of a positive electrode plate, an end portion of a separator, and an end portion of a negative electrode plate are disposed and when the stacked end portion is disposed adjacent to a sealing plate, curling of the separator may occur when electrolytic solution is introduced through an electrolytic solution introduction hole in the sealing plate. When curling of the separator occurs, the positive electrode plate and the negative electrode plate that are adjacent to each other may come into contact with each other and cause short-circuiting. Also, a portion of a positive-electrode-active-material layer or a negative-electrode-active-material layer may fall and cause short-circuiting.

According to the configuration of the secondary battery of the embodiment of the present disclosure, the separator can be effectively prevented from curling when the electrolytic solution is introduced through the electrolytic solution introduction hole in the sealing plate. Therefore, short-circuiting between the positive electrode plate and the negative electrode plate can be effectively prevented.

According to the present disclosure, the separator can be prevented from curling when the electrolytic solution is introduced into the battery case through the electrolytic solution introduction hole in the battery case. Therefore, a highly reliable secondary battery in which short-circuiting between the positive electrode plate and the negative electrode plate is prevented can be provided.

DETAILED DESCRIPTION OF THE INVENTION

The structure of a rectangular secondary battery 20 will now be described as a secondary battery according to an embodiment. The present invention is not limited to the embodiment described below.

Figure 1:
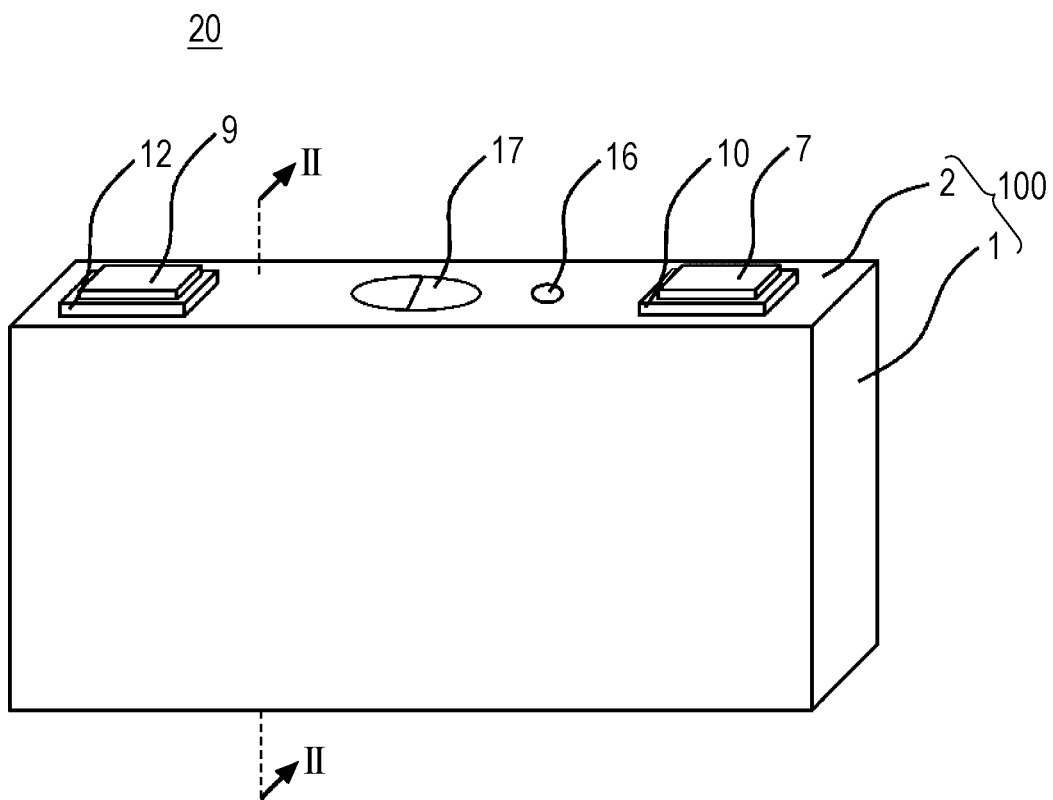
FIG. 1 is a perspective view of a rectangular secondary battery according to an embodiment.
Figure 2:
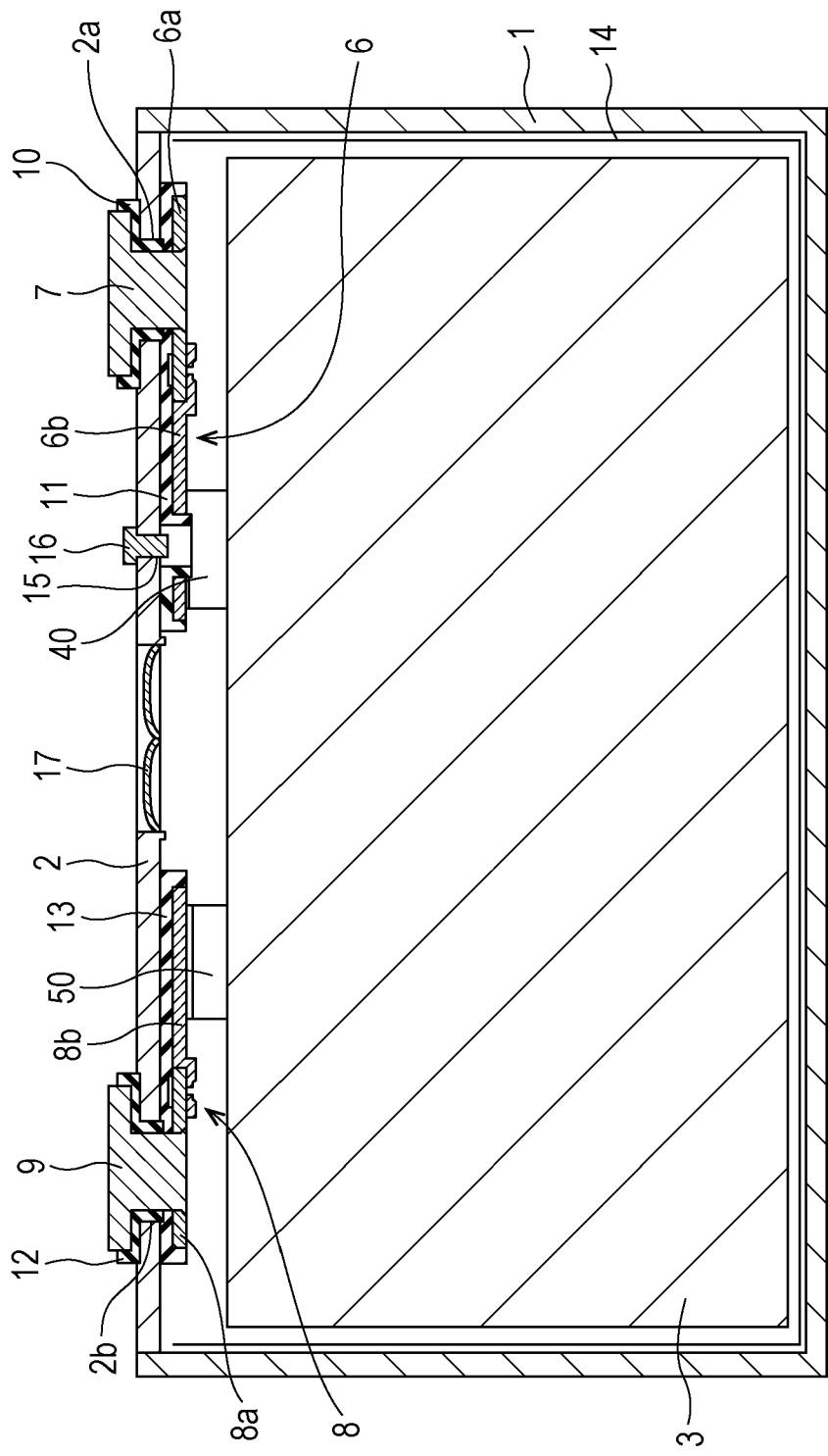
FIG. 2 is a sectional view of the rectangular secondary battery taken along line II-II in FIG. 1.

As illustrated in FIGS. 1 and 2, the rectangular secondary battery 20 includes a battery case 100 including a rectangular exterior body 1 having the shape of a rectangular tube with an opening and a bottom and a sealing plate 2 that seals the opening in the rectangular exterior body 1. The rectangular exterior body 1 and the sealing plate 2 are preferably made of metal. The rectangular exterior body 1 contains electrode assemblies 3, which each include positive electrode plates and negative electrode plates, together with an electrolyte.

Each electrode assembly 3 includes a positive-electrode tab group 40 including a plurality of positive-electrode tabs 4d and a negative-electrode tab group 50 including a plurality of negative-electrode tabs 5c at an end thereof adjacent to the sealing plate 2. The positive-electrode tab group 40 is electrically connected to a positive electrode terminal 7 by a second positive-electrode current collector 6b and a first positive-electrode current collector 6a. The negative-electrode tab group 50 is electrically connected to a negative electrode terminal 9 by a second negative-electrode current collector 8b and a first negative-electrode current collector 8a. The first positive-electrode current collector 6a and the second positive-electrode current collector 6b form a positive-electrode current collector 6. The positive-electrode current collector 6 may instead be formed of a single component. The first negative-electrode current collector 8a and the second negative-electrode current collector 8b form a negative-electrode current collector 8. The negative-electrode current collector 8 may instead be formed of a single component.

The first positive-electrode current collector 6a, the second positive-electrode current collector 6b, and the positive electrode terminal 7 are preferably made of metal, more preferably aluminum or an aluminum alloy. An outer insulating member 10 made of resin is disposed between the positive electrode terminal 7 and the sealing plate 2. An inner insulating member 11 made of resin is disposed between the first positive-electrode current collector 6a and the sealing plate 2 and between the second positive-electrode current collector 6b and the sealing plate 2.

The first negative-electrode current collector 8a, the second negative-electrode current collector 8b, and the negative electrode terminal 9 are preferably made of metal, more preferably copper or a copper alloy. The negative electrode terminal 9 preferably includes a portion made of aluminum or an aluminum alloy and a portion made of copper or a copper alloy. In this case, preferably, the portion made of copper or a copper alloy is connected to the first negative-electrode current collector 8a, and the portion made of aluminum or an aluminum alloy projects outward beyond the sealing plate 2. An outer insulating member 12 made of resin is disposed between the negative electrode terminal 9 and the sealing plate 2. An inner insulating member 13 made of resin is disposed between the first negative-electrode current collector 8a and the sealing plate 2 and between the second negative-electrode current collector 8b and the sealing plate 2.

An electrode assembly holder 14 formed of an insulating sheet made of resin is disposed between the rectangular exterior body 1 and the electrode assemblies 3. The electrode assembly holder 14 is preferably formed by folding an insulating sheet made of resin in the shape of a bag or a box.

The sealing plate 2 has an electrolytic solution introduction hole 15. The electrolytic solution introduction hole 15 is sealed with a sealing member 16. The sealing member 16 may be a blind rivet. Alternatively, the sealing member 16 may be made of metal and welded to the sealing plate 2. The sealing plate 2 includes a gas discharge valve 17 that breaks to enable gas in the battery case 100 to be discharged from the battery case 100 when the pressure in the battery case 100 reaches or exceeds a predetermined pressure.

A method for manufacturing the rectangular secondary battery 20 and the structure of the rectangular secondary battery 20 will now be described in detail.

Positive Electrode Plate

A method for manufacturing a positive electrode plate will now be described.

Production of Positive-Electrode-Active-Material Layer Slurry

A positive-electrode-active-material layer slurry is produced by mixing a lithium nickel cobalt manganese composite oxide that serves as a positive electrode active material, polyvinylidene fluoride (PVdF) that serves as a binder, a carbon material that serves as a conductive agent, and N-methyl-2-pyrrolidone (NMP) that serves as a dispersion medium so that the mass ratio between the lithium nickel cobalt manganese composite oxide, PVdF, and the carbon material is 97.5:1:1.5.

Production of Positive-Electrode-Protecting Layer Slurry

A protecting layer slurry is produced by mixing alumina powder, a carbon material that serves as a conductive agent, polyvinylidene fluoride (PVdF) that serves as a binder, and N-methyl-2-pyrrolidone (NMP) that serves as a dispersion medium so that the mass ratio between the alumina powder, the carbon material, and PVdF is 83:3:14.

Formation of Positive-Electrode-Active-Material Layers and Positive-Electrode-Protecting Layers The positive-electrode-active-material layer slurry and the positive-electrode-protecting layer slurry produced by the above-described methods are applied to both sides of an aluminum foil having a thickness of 15 µm serving as a positive electrode core by using a die coater. The positive-electrode-protecting layer slurry is applied in regions near end portions of the regions in which the positive-electrode-active-material layer slurry is applied to the positive electrode core.

The positive electrode core to which the positive-electrode-active-material layer slurry and the positive-electrodeprotecting layer slurry are applied is dried to remove NMP contained in the positive-electrode-active-material layer slurry and the positive-electrode-protecting layer slurry. Thus, positive-electrode-active-material layers and protecting layers are formed. After that, the positive-electrode-active-material layers are compressed by being passed between a pair of press rollers, so that a positive electrode original plate is formed. A positive electrode plate 4 is formed by cutting the positive electrode original plate in a predetermined shape.

Figure 3A:
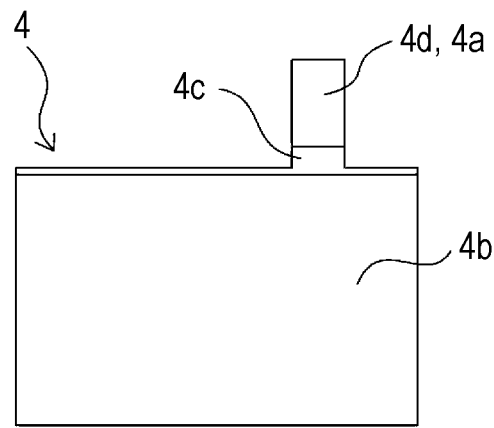
FIG. 3A is a plan view of a positive electrode plate according to the embodiment.

FIG. 3A is a plan view of the positive electrode plate 4. The positive electrode plate 4 includes an aluminum foil that serves as a positive electrode core 4a and positive-electrode-active-material layers 4b formed on both sides of the aluminum foil. The positive electrode plate 4 includes a positive-electrode tab 4d at one edge thereof, the positive-electrode tab 4d being an exposed portion of the positive electrode core 4a that does not have the positive-electrode-active-material layers 4b on both sides thereof. The positive electrode plate 4 includes positive-electrode-protecting layers 4c formed on both sides of the positive electrode core 4a in regions near the edge at which the positive-electrode tab 4d is provided and near the proximal end of the positive-electrode tab 4d.

Negative Electrode Plate

A method for manufacturing a negative electrode plate will now be described.

Production of Negative-Electrode-Active-Material Layer Slurry

A negative-electrode-active-material layer slurry is produced by mixing graphite that serves as a negative electrode active material, styrene butadiene rubber (SBR) and carboxymethyl cellulose (CMC) that serve as a binder, and water that serves as a dispersion medium so that the mass ratio between graphite, SBR, and CMC is 98:1:1.

Formation of Negative-Electrode-Active-Material Layers

The negative-electrode-active-material layer slurry produced by the above-described method is applied to both sides of a copper foil having a thickness of 8 μm serving as a negative electrode core by using a die coater.

The negative electrode core to which the negative-electrode-active-material layer slurry is applied is dried to remove water contained in the negative-electrode-active-material layer slurry. Thus, negative-electrode-active-material layers are formed. After that, the negative-electrode-active-material layers are compressed by being passed between a pair of press rollers, so that a negative electrode original plate is formed. A negative electrode plate 5 is formed by cutting the negative electrode original plate in a predetermined shape.

Figure 3B:
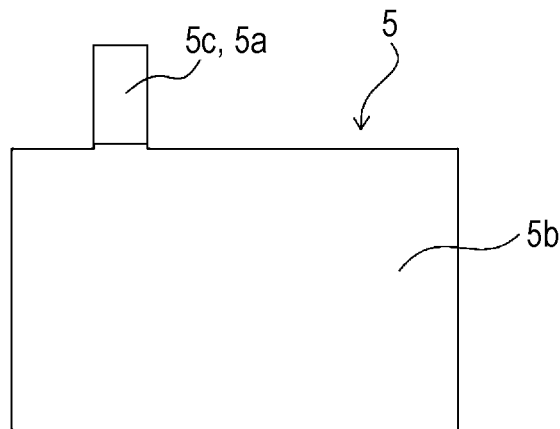
FIG. 3B is a plan view of a negative electrode plate according to the embodiment.

FIG. 3B is a plan view of the negative electrode plate 5. The negative electrode plate 5 includes a copper foil that serves as a negative electrode core 5a and negative-electrode-active-material layers 5b formed on both sides of the copper foil. The negative electrode plate 5 includes a negative-electrode tab 5c at one edge thereof, the negative-electrode tab 5c being an exposed portion of the negative electrode core 5a that does not have the negative-electrode-active-material layers 5b on both sides thereof.

Production of Electrode Assembly

Figure 4:
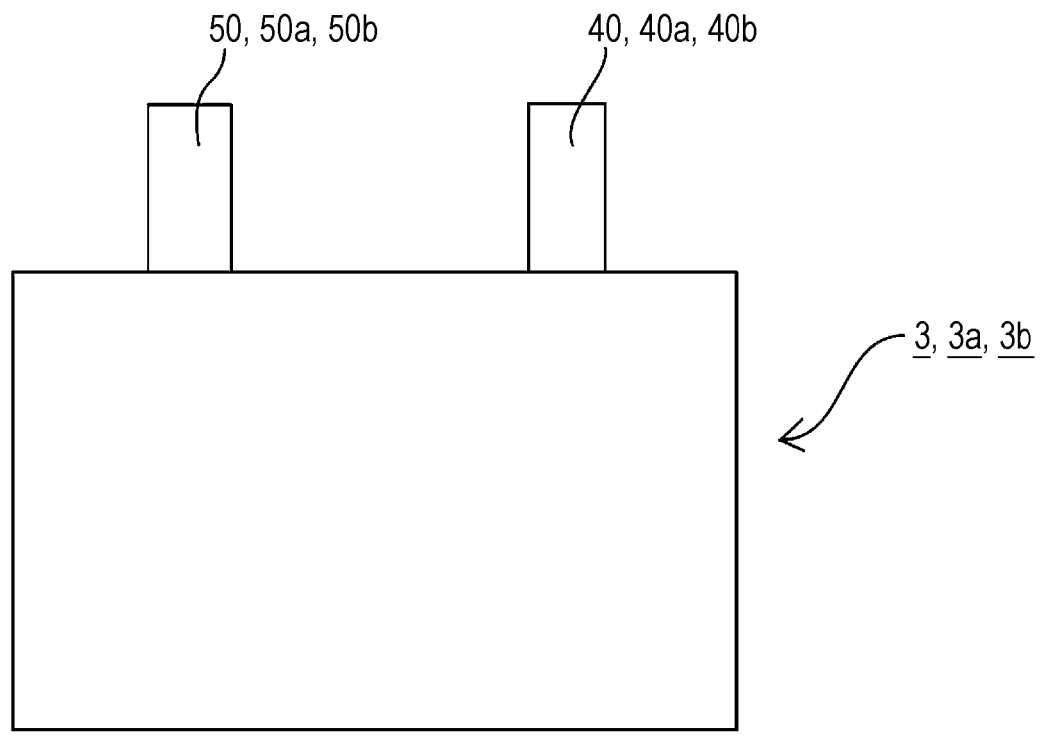
FIG. 4 is a plan view of an electrode assembly according to the embodiment.

An electrode assembly 3 having a stacked structure is manufactured by stacking positive electrode plates 4 and negative electrode plates 5 produced by the above-described method with rectangular separators 90 made of polyolefin interposed therebetween. FIG. 4 is a plan view of the electrode assembly 3. The electrode assembly 3 includes the positive-electrode tab group 40 at an end thereof, the positive-electrode tab group 40 being formed by stacking the positive-electrode tabs 4d of the positive electrode plates 4. The electrode assembly 3 also includes the negative-electrode tab group 50 at the end thereof, the negative-electrode tab group 50 being formed by stacking the negative-electrode tabs 5c of the negative electrode plates 5. The electrode assembly 3 is flat. The electrode assembly 3 has the separators 90 on both outer surfaces thereof in the direction in which the positive electrode plates 4, the separators 90, and the negative electrode plates 5 are stacked.

The electrode assembly 3 may include either a plurality of rectangular separators or a band-shaped separator that is fan-folded. Alternatively, a band-shaped separator may be wound in the electrode assembly 3. The separators may include a base material made of polyolefin and a heat-resistant layer provided on a surface of the base material. The heat-resistant layer includes inorganic powder, such as ceramic powder, and a binder. The separators may have an adhesive layer on a surface thereof, and be bonded to the positive electrode plates 4 and/or the negative electrode plates 5 by the adhesive layer.

The number of positive electrode plates stacked in a single electrode assembly 3 is not limited, but is preferably 10 to 100, and more preferably 30 to 80. The number of negative electrode plates included in a single electrode assembly 3 is preferably greater than the number of positive electrode plates by one so that both surfaces of each of the positive electrode plates face the negative electrode plates.

The electrode assembly 3 may instead be a flat-wound electrode assembly obtained by winding a band-shaped positive electrode plate and a band-shaped negative electrode plate with a band-shaped separator interposed therebetween.

Connection between Current Collectors and Tabs

Two electrode assemblies 3, which will be referred to as a first electrode assembly 3a and a second electrode assembly 3b, are produced by the above-described method. The positive-electrode tab group 40 and the negative-electrode tab group 50 of the first electrode assembly 3a will be respectively referred to as a first positive-electrode tab group 40a and a first negative-electrode tab group 50a. The positive-electrode tab group 40 and the negative-electrode tab group 50 of the second electrode assembly 3b will be respectively referred to as a second positive-electrode tab group 40b and a second negative-electrode tab group 50b. The first electrode assembly 3a and the second electrode assembly 3b may have completely the same structure or different structures.

Figure 5:
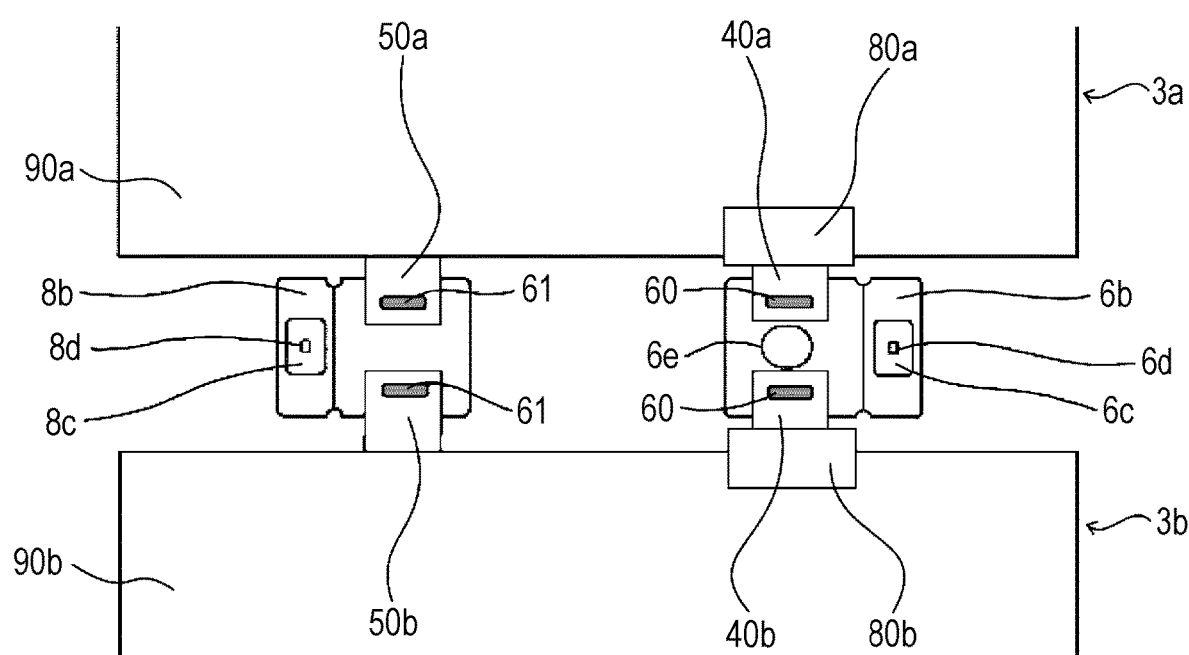
FIG. 5 illustrates a state in which positive-electrode tab groups are connected to a second positive-electrode current collector and negative-electrode tab groups are connected to a second negative-electrode current collector.

As illustrated in FIG. 5, the first positive-electrode tab group 40a of the first electrode assembly 3a and the second positive-electrode tab group 40b of the second electrode assembly 3b are connected to the second positive-electrode current collector 6b to form joined portions 60. The first negative-electrode tab group 50a of the first electrode assembly 3a and the second negative-electrode tab group 50b of the second electrode assembly 3b are connected to the second negative-electrode current collector 8b to form joined portions 61. The joining method may be, for example, ultrasonic welding (ultrasonic bonding), resistance welding, or laser welding.

Figure 6A:
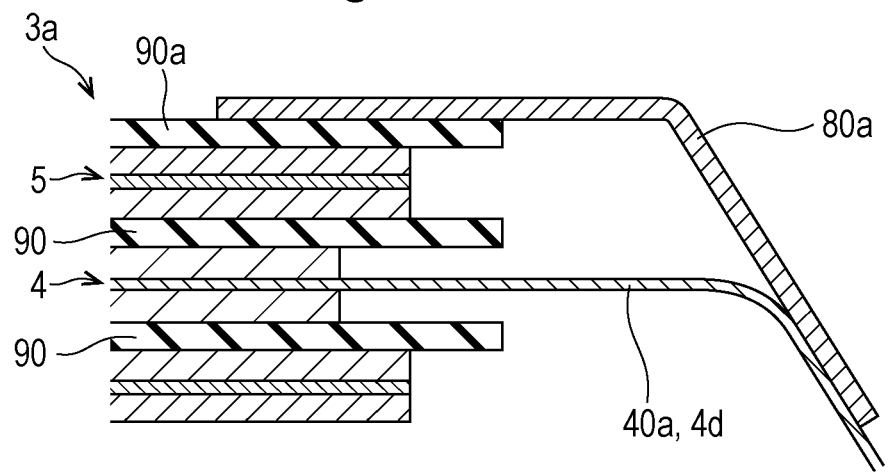
FIG. 6A is an enlarged sectional view of a region including an outermost surface of a first electrode assembly and a first positive-electrode tab group.

As illustrated in FIGS. 5 and 6A, a first outermost separator 90a, which serves as a first insulating sheet, is provided on an outermost surface of the first electrode assembly 3a that is adjacent to the second electrode assembly 3b when the rectangular secondary battery 20 is completed. A first tape 80a is attached to both the first outermost separator 90a and the positive-electrode tabs 4d that form the first positive-electrode tab group 40a. The first tape 80a may be attached either before or after the first positive-electrode tab group 40a and the second positive-electrode tab group 40b are connected to the second positive-electrode current collector 6b.

Figure 6B:
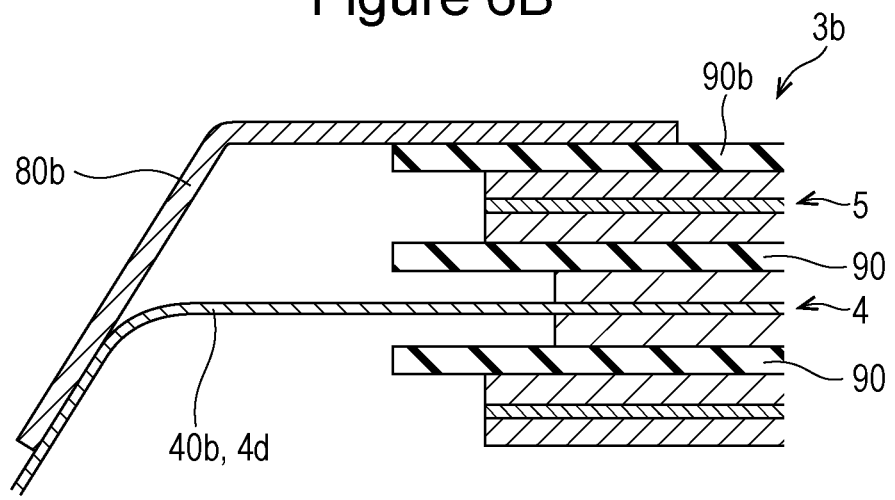
FIG. 6B is an enlarged sectional view of a region including an outermost surface of a second electrode assembly and a second positive-electrode tab group.

As illustrated in FIGS. 5 and 6B, a second outermost separator 90b, which serves as a second insulating sheet, is provided on an outermost surface of the second electrode assembly 3b that is adjacent to the first electrode assembly 3a when the rectangular secondary battery 20 is completed. A second tape 80b is attached to both the second outermost separator 90b and the positive-electrode tabs 4d that form the second positive-electrode tab group 40b. The second tape 80b may be attached either before or after the first negative-electrode tab group 50a and the second negative-electrode tab group 50b are connected to the second negative-electrode current collector 8b.

The second positive-electrode current collector 6b includes a thin portion 6c, which has a current-collector opening 6d formed therein. The second positive-electrode current collector 6b has a current-collector through hole 6e located to face the electrolytic solution introduction hole 15 in the sealing plate 2. The second negative-electrode current collector 8b includes a thin portion 8c, which has a current-collector opening 8d formed therein.

Attachment of Components to Sealing Plate

Figure 7:
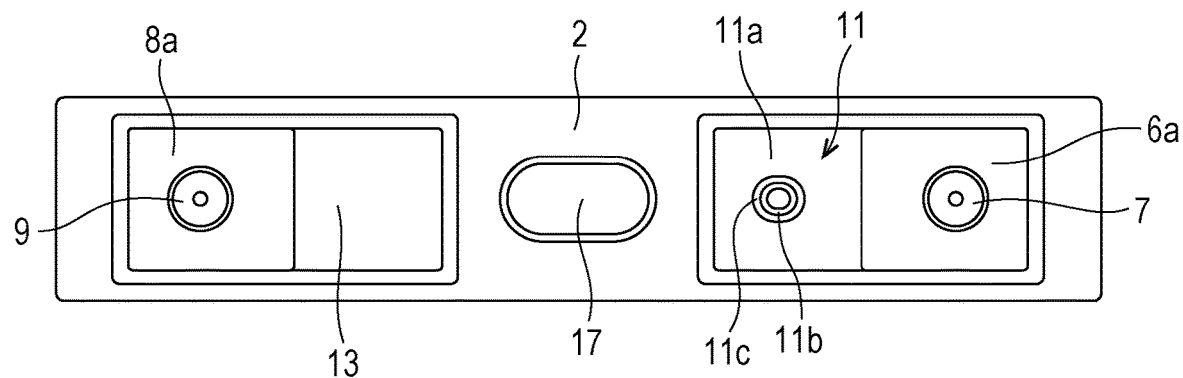
FIG. 7 illustrates a surface of a sealing plate facing electrode assemblies after a first positive-electrode current collector and a first negative-electrode current collector are attached.

FIG. 7 illustrates a surface of the sealing plate 2 that faces the inside of the battery and to which components are attached. The components are attached to the sealing plate 2 as described below.

The outer insulating member 10 is disposed on a surface of the sealing plate 2 that faces the outside of the battery in a region around the positive-electrode-terminal-receiving hole 2a. The inner insulating member 11 and the first positive-electrode current collector 6a are disposed on the surface of the sealing plate 2 that faces the inside of the battery in a region around the positive-electrode-terminal-receiving hole 2a. The positive electrode terminal 7 is inserted through a through hole in the outer insulating member 10, the positive-electrode-terminal-receiving hole 2a in the sealing plate 2, a through hole in the inner insulating member 11, and a through hole in the first positive-electrode current collector 6a from the outside of the battery, and an end of the positive electrode terminal 7 is crimped onto the first positive-electrode current collector 6a. Thus, the positive electrode terminal 7 and the first positive-electrode current collector 6a are fixed to the sealing plate 2. The crimped portion of the positive electrode terminal 7 and the first positive-electrode current collector 6a are preferably welded to each other.

The outer insulating member 12 is disposed on the surface of the sealing plate 2 that faces the outside of the battery in a region around the negative-electrode-terminal-receiving hole 2b. The inner insulating member 13 and the first negative-electrode current collector 8a are disposed on the surface of the sealing plate 2 that faces the inside of the battery in a region around the negative-electrode-terminal-receiving hole 2b. The negative electrode terminal 9 is inserted through a through hole in the outer insulating member 12, the negative-electrode-terminal-receiving hole 2b in the sealing plate 2, a through hole in the inner insulating member 13, and a through hole in the first negative-electrode current collector 8a from the outside of the battery, and an end of the negative electrode terminal 9 is crimped onto the first negative-electrode current collector 8a. Thus, the negative electrode terminal 9 and the first negative-electrode current collector 8a are fixed to the sealing plate 2. The crimped portion of the negative electrode terminal 9 and the first negative-electrode current collector 8a are preferably welded to each other.

The inner insulating member 11 includes an insulating member main portion 11a that extends along the surface of the sealing plate 2 facing the inside of the battery. The insulating member main portion 11a has an insulating member opening 11b located to face the electrolytic solution introduction hole 15 in the sealing plate 2. A tubular portion 11c is provided around the insulating member opening 11b. The tubular portion 11c extends from the insulating member main portion 11a toward the first electrode assembly 3a and the second electrode assembly 3b.

Connection between First Current Collectors and Second Current Collectors

Figure 8:
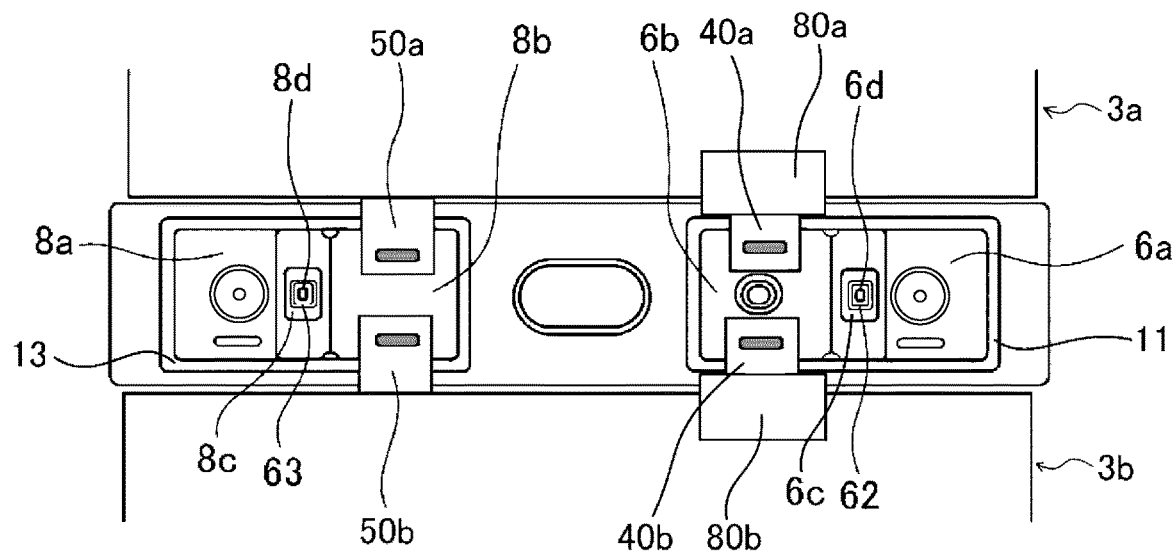
FIG. 8 illustrates the surface of the sealing plate facing the electrode assemblies after the second positive-electrode current collector is attached to the first positive-electrode current collector and the second negative-electrode current collector is attached to the first negative-electrode current collector.

FIG. 8 illustrates the surface of the sealing plate 2 facing the inside of the battery after the second positive-electrode current collector 6b is attached to the first positive-electrode current collector 6a and the second negative-electrode current collector 8b is attached to the first negative-electrode current collector 8a.

The second positive-electrode current collector 6b to which the first positive-electrode tab group 40a and the second positive-electrode tab group 40b are connected is placed on the inner insulating member 11 so that the second positive-electrode current collector 6b partially overlaps the first positive-electrode current collector 6a. Then, the thin portion 6c is irradiated with a laser beam to join the second positive-electrode current collector 6b and the first positive-electrode current collector 6a together. Thus, a joined portion 62 is formed. In addition, the second negative-electrode current collector 8b to which the first negative-electrode tab group 50a and the second negative-electrode tab group 50b are connected is placed on the inner insulating member 13 so that the second negative-electrode current collector 8b partially overlaps the first negative-electrode current collector 8a. Then, the thin portion 8c is irradiated with a laser beam to join the second negative-electrode current collector 8b and the first negative-electrode current collector 8a together. Thus, the joined portion 63 is formed.

Assembly of Rectangular Secondary Battery

The first electrode assembly 3a and the second electrode assembly 3b are brought together. At this time, the first positive-electrode tab group 40a and the second positive-electrode tab group 40b are bent in different directions, and the first negative-electrode tab group 50a and the second negative-electrode tab group 50b are bent in different directions. The first electrode assembly 3a and the second electrode assembly 3b that have been brought together are placed in the electrode assembly holder 14, which is composed of an insulating sheet formed in the shape of a box or a bag.

The first electrode assembly 3a and the second electrode assembly 3b covered with the electrode assembly holder 14 are inserted into the rectangular exterior body 1. Then, the sealing plate 2 and the rectangular exterior body 1 are welded together to seal the opening in the rectangular exterior body 1 with the sealing plate 2.

Figure 9:
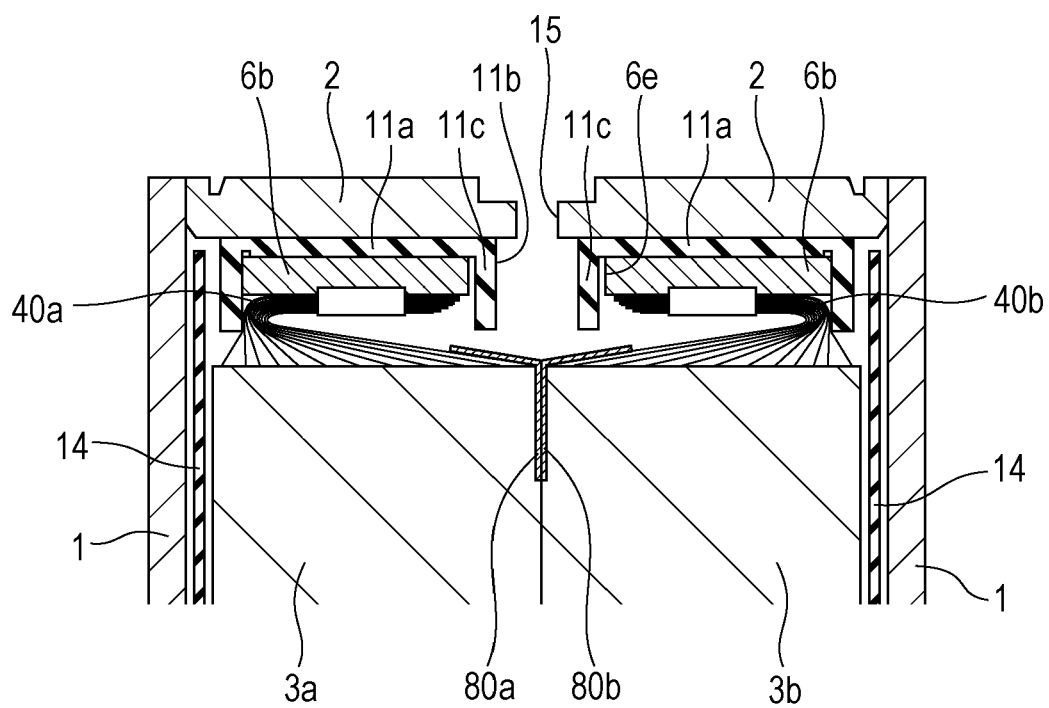
FIG. 9 is a sectional view of the sealing plate 2 taken in a short-side direction, illustrating a region including an electrolytic solution introduction hole.

FIG. 9 is a sectional view of the sealing plate 2 taken in the short-side direction, illustrating the region around the electrolytic solution introduction hole 15 after the opening in the rectangular exterior body 1 is sealed by the sealing plate 2.

As illustrated in FIG. 9, the electrolytic solution introduction hole 15 is disposed between the first positive-electrode tab group 40a and the second positive-electrode tab group 40b in the short-side direction of the sealing plate 2. The first tape 80*a* and the second tape 80*b* are located to face the electrolytic solution introduction hole 15. As described above, the first positive-electrode tab group 40*a* and the second positive-electrode tab group 40*b* are bent in different directions.

Electrolytic solution is introduced into the battery case 100 through the electrolytic solution introduction hole 15 in the sealing plate 2. The electrolytic solution may be, for example, nonaqueous electrolytic solution obtained by dissolving electrolyte salt in an organic solvent. The electrolytic solution introduced into the battery case 100 through the electrolytic solution introduction hole 15 in the sealing plate 2 passes through the insulating member opening 11*b*, the tubular portion 11*c*, and the current-collector through hole 6*e*, and flows toward the first electrode assembly 3*a* and the second electrode assembly 3*b*.

The first tape 80*a* is attached to both the first outermost separator 90*a* on the outermost surface of the first electrode assembly 3*a* adjacent to the second electrode assembly 3*b* and the first positive-electrode tab group 40*a*. The second tape 80*b* is attached to both the second outermost separator 90*b* on the outermost surface of the second electrode assembly 3*b* adjacent to the first electrode assembly 3*a* and the second positive-electrode tab group 40*b*. Therefore, the first outermost separator 90*a*, the second outermost separator 90*b*, and other separators 90 are prevented from being curled due to the electrolytic solution that is introduced.

Therefore, short-circuiting between unintended portions of the positive electrode plates 4 and the negative electrode plates 5 due to curling of the first outermost separator 90*a*, the second outermost separator 90*b*, or other separators 90 can be prevented. In addition, falling of portions of the positive-electrode-active-material layers 4*b* and the negative-electrode-active-material layers 5*b* due to the electrolytic solution being forcefully introduced can be reliably prevented. Accordingly, short-circuiting due to fallen portions of the positive-electrode-active-material layers 4*b* or the negative-electrode-active-material layers 5*b* can be prevented.

As illustrated in FIGS. 5 and 8, the first tape 80*a* and the second tape 80*b* preferably have widths greater than the widths of the first positive-electrode tab group 40*a* and the second positive-electrode tab group 40*b*. In such a case, the first outermost separator 90*a*, the second outermost separator 90*b*, and other separators 90 can be more effectively prevented from curling.

The first tape 80*a* and the second tape 80*b* may have widths less than the widths of the first positive-electrode tab group 40*a* and the second positive-electrode tab group 40*b*. When a current interruption mechanism is provided on a conductive path between the first positive-electrode tab group 40*a* and the positive electrode terminal 7 and between the second positive-electrode tab group 40*b* and the positive electrode terminal 7, the first tape 80*a* and the second tape 80*b* can be reliably prevented from coming into contact with the current interruption mechanism by setting the widths of the first tape 80*a* and the second tape 80*b* less than the widths of the first positive-electrode tab group 40*a* and the second positive-electrode tab group 40*b*. Also, when the first tape 80*a* and the second tape 80*b* have widths less than the widths of the first positive-electrode tab group 40*a* and the second positive-electrode tab group 40*b*, the first tape 80*a* and the second tape 80*b* do not come into contact with the current interruption mechanism when being attached. Accordingly, the first tape 80*a* and the second tape 80*b* can be appropriately attached.

The length of at least one of the first tape 80*a* and the second tape 80*b* may be increased so that at least one of the first tape 80*a* and the second tape 80*b* covers at least one of the joined portions 60. If at least one joined portion 60 is covered with at least one of the first tape 80*a* and the second tape 80*b*, even when foreign matter, such as metal powder, is attached to the joined portion 60, the metal powder or the like can be prevented from entering the electrode assembly 3.

The tubular portion 11*c* preferably extends through the current-collector through hole 6*e*. An end portion (bottom end portion in FIG. 9) of the tubular portion 11*c* adjacent to the first electrode assembly 3*a* and the second electrode assembly 3*b* is preferably closer to the first electrode assembly 3*a* and the second electrode assembly 3*b* (bottom side in FIG. 9) than the surface of the first positive-electrode tab group 40*a* adjacent to the first electrode assembly 3*a* and the second electrode assembly 3*b*, the first positive-electrode tab group 40*a* being stacked on the second positive-electrode current collector 6*b*. An end portion (bottom end portion in FIG. 9) of the tubular portion 11*c* adjacent to the first electrode assembly 3*a* and the second electrode assembly 3*b* is preferably closer to the first electrode assembly 3*a* and the second electrode assembly 3*b* (bottom side in FIG. 9) than the surface of the second positive-electrode tab group 40*b* adjacent to the first electrode assembly 3*a* and the second electrode assembly 3*b*, the second positive-electrode tab group 40*b* being stacked on the second positive-electrode current collector 6*b*.

After the electrolytic solution is introduced into the battery case 100 through the electrolytic solution introduction hole 15 in the sealing plate 2, the electrolytic solution introduction hole 15 is sealed with the sealing member 16, such as a blind rivet.

Tape

The tape, such as the first tape 80*a* and the second tape 80*b*, preferably includes a base material layer and an adhesive layer formed on the base material layer. The base material layer is preferably made of resin. The base material layer is preferably made of a material selected from polypropylene, polyimide, polyphenylene sulfide, polyethylene, polyester, polyethylene naphthalate, etc., or a mixture thereof. In particular, the base material layer is preferably made of polypropylene.

The adhesive layer is preferably adhesive at normal temperature (25° C.). The adhesive layer may be heat-weldable. The adhesive layer is preferably made of a material selected from a rubber-based adhesive, an acrylic adhesive, a polyethylene-based adhesive, etc., or a mixture thereof. In particular, the adhesive layer is preferably made of a rubber-based adhesive. The tape may be a heat-weldable sheet. In this case, the tape is attached by heat welding. The tape may be a glass cloth tape.

The thickness of the tape is not particularly limited, and may be, for example, 10 μm to 500 μm.

The timing at which the tape is attached to both a tab group and an insulating sheet is not particularly limited as long as the tape is attached before the electrolytic solution is introduced into the battery case through the electrolytic solution introduction hole. The tape may be attached either before or after the tab group is connected to a current collector.

Insulating Sheet

The insulating sheet disposed on the outermost surface of each electrode assembly may be made of the same material as that of the separators disposed between the positive electrode plates and the negative electrode plates. Alternatively, the insulating sheet disposed on the outermost surface of each electrode assembly may be different from the separators. The insulating sheet may be non-porous, but is preferably porous so that electrolytic solution easily permeates into the electrode assembly.

When a fan-folded separator is used, one end portion of the separator may be wound at the outermost periphery of the electrode assembly. The portion of the separator at the outermost periphery of the electrode assembly may serve as the insulating sheet. Alternatively, an insulating sheet that is separate from the fan-folded separator may be wound at the outermost periphery of the electrode assembly.

When the electrode assembly has a wound structure, a band-shaped separator disposed between a positive electrode plate and a negative electrode plate may be formed such that the separator is wound at the outermost periphery of the electrode assembly. The portion of the separator at the outermost periphery may serve as the insulating sheet. Alternatively, an insulating sheet that is separate from the band-shaped separator may be wound at the outermost periphery of the electrode assembly.

In the above-described embodiment, the positive-electrode tab groups are located to face the electrolytic solution introduction hole in the sealing plate. However, the negative-electrode tab groups may instead be located to face the electrolytic solution introduction hole.

In the above-described embodiment, the first electrode assembly 3a and the second electrode assembly 3b have a stacked structure. However, each of the first electrode assembly 3a and the second electrode assembly 3b may instead have a wound structure. When the first electrode assembly 3a and the second electrode assembly 3b each have a wound structure, the first electrode assembly 3a and the second electrode assembly 3b are each configured such that the positive-electrode tab group and the negative-electrode tab group are provided at an end thereof adjacent to the sealing plate 2.

In the above-described embodiment, the positive-electrode current collector and the negative-electrode current collector are each formed of two components. Alternatively, however, the positive-electrode current collector and the negative-electrode current collector may each be formed of a single component. When the positive-electrode current collector and the negative-electrode current collector are each composed of a single component, the positive-electrode current collector and the negative-electrode current collector are preferably respectively connected to the positive electrode terminal and the negative electrode terminal attached to the sealing plate after the positive-electrode tab group and the negative-electrode tab group are respectively connected to the positive-electrode current collector and the negative-electrode current collector.

In plan view of each electrode assembly that is flat, the tape may be attached to the insulating sheet on the outermost surface of the electrode assembly such that the tape does not overlap the positive-electrode-active-material layer. In such a case, the electrode assembly can be prevented from receiving a large local pressure.

The positive electrode plates, the negative electrode plates, the separators, the electrolyte, etc. may be composed of known materials.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
   a first electrode assembly including a positive electrode plate and a negative electrode plate;
   a second electrode assembly including a positive electrode plate and a negative electrode plate;
   an exterior body having an opening and containing the first electrode assembly and the second electrode assembly;
   a sealing plate sealing the opening;
   a current collector that is closer to the sealing plate than are the first electrode assembly and the second electrode assembly; and
   a terminal electrically connected to the current collector and attached to the sealing plate,
   wherein the sealing plate has an electrolytic solution introduction hole,
   wherein the first electrode assembly includes a first insulating sheet on an outermost surface thereof adjacent to the second electrode assembly,
   wherein the first electrode assembly includes a first electrode tab group at an end thereof adjacent to the sealing plate,
   the first electrode tab group being electrically connected to the positive electrode plate or the negative electrode plate,
   wherein the second electrode assembly includes a second electrode tab group at an end thereof adjacent to the sealing plate,
   the second electrode tab group being electrically connected to the positive electrode plate or the negative electrode plate,
   wherein the first electrode tab group and the second electrode tab group are connected to the current collector,
   wherein a first tape is attached to both an outermost surface of the first electrode tab group and the first insulating sheet,
   wherein the outermost surface of the first electrode tab group is located at one side of the first electrode tab group nearer the second electrode assembly than the other side of the first electrode tab group in an alignment direction in which the first electrode assembly and the second electrode assembly are aligned with each other,
   wherein the first tape overlaps the electrolytic solution introduction hole in a thickness direction of the sealing plate, and
   wherein the electrolytic solution introduction hole is sealed by a sealing member.

2. The secondary battery according to claim 1,
   wherein the second electrode assembly includes a second insulating sheet on an outermost surface thereof adjacent to the first electrode assembly,
   wherein a second tape is attached to both an outermost surface of the second electrode tab group and the second insulating sheet,
   wherein the outermost surface of the second electrode tab group is located at one side of the second electrode tab group nearer the first electrode assembly than the other side of the second electrode tab group in the alignment direction.

3. The secondary battery according to claim 2,
   wherein the first insulating sheet is a porous sheet, and
   wherein the second insulating sheet is a porous sheet.

4. The secondary battery according to claim 1,
wherein the first electrode assembly is a stacked electrode assembly including a plurality of the positive electrode plates and a plurality of the negative electrode plates, and
wherein the second electrode assembly is a stacked electrode assembly including a plurality of the positive electrode plates and a plurality of the negative electrode plates.

5. The secondary battery according to claim 1, further comprising:
an insulating member disposed on a side of the sealing plate facing an inside of the secondary battery,
wherein the insulating member has an insulating member opening located to face the electrolytic solution introduction hole, and
wherein a tubular portion is formed around the insulating member opening.

6. The secondary battery according to claim 1,
wherein the current collector has a current-collector through hole located to face the electrolytic solution introduction hole.

7. The secondary battery according to claim 2,
wherein the second tape is located to face the electrolytic solution introduction hole, and includes a region which is located on the outermost surface of the second electrode tab group and overlaps the electrolytic solution introduction hole in the thickness direction of the sealing plate.

8. The secondary battery according to claim 5,
wherein the insulating member includes an insulating member main portion that extends along an inner surface of the sealing plate,
wherein the tubular portion protrudes inward toward the first electrode assembly and the second electrode assembly away from the insulating member main portion.

* * * * *